United States Patent
Hamasaki

(10) Patent No.: US 11,941,126 B2
(45) Date of Patent: Mar. 26, 2024

(54) CENTER, INFORMATION REWRITING METHOD, AND NON-TRANSITORY STORAGE MEDIUM

(71) Applicant: TOYOTA JIDOSHA KABUSHIKI KAISHA, Toyota (JP)

(72) Inventor: Jun Hamasaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 198 days.

(21) Appl. No.: 17/522,336

(22) Filed: Nov. 9, 2021

(65) Prior Publication Data
US 2022/0242372 A1  Aug. 4, 2022

(30) Foreign Application Priority Data
Feb. 2, 2021  (JP) .................................. 2021-015061

(51) Int. Cl.
| | |
|---|---|
| G06F 21/57 | (2013.01) |
| B60R 25/34 | (2013.01) |
| G06F 8/65 | (2018.01) |
| G06F 21/44 | (2013.01) |
| G07C 9/00 | (2020.01) |

(52) U.S. Cl.
CPC .............. *G06F 21/57* (2013.01); *B60R 25/34* (2013.01); *G06F 8/65* (2013.01); *G06F 21/44* (2013.01); *G07C 9/00309* (2013.01); *G07C 2009/00753* (2013.01)

(58) Field of Classification Search
CPC ....................................................... B60R 25/40
USPC ............................................................ 717/168
See application file for complete search history.

(56) References Cited

FOREIGN PATENT DOCUMENTS

JP        2004-326689 A    11/2004

OTHER PUBLICATIONS

Halder et al,, Secure over-the-air software updates in connected vehicles, Jun. 2020, Elsevier, pp. 1-19. (Year: 2020).*
Steger et al., An Efficient and Secure Automotive Wireless Software Update Framework, May 2018, IEEE, vol. 14, No. 5, pp. 2182-2193. (Year: 2018).*

* cited by examiner

*Primary Examiner* — John Q Chavis
(74) *Attorney, Agent, or Firm* — Oliff PLC

(57) ABSTRACT

A center, configured to communicate with an OTA master configured to control software updating of an electronic control unit via a first network, includes a processor. The electronic control unit is installed in a vehicle. The processor is configured to store vehicle management information including key information used for authenticating the vehicle, receive an authentication signal from the vehicle via the first network. The authentication signal is signed using a unique key imparted to predetermined equipment installed in the vehicle. The processor is configured to perform authentication of the vehicle based on the vehicle management information and the authentication signal, and when the processor receives the key information from the vehicle, rewrites the vehicle management information stored by the processor based on the key information.

7 Claims, 5 Drawing Sheets

| ID OF VEHICLE | CENTER-SIDE KEY |
|---|---|
| A | KEY-A |
| B | KEY-B |
| C | KEY-X |
| D | KEY-Y |
| ⋮ | ⋮ |

FIG. 4

| CENTER-SIDE KEY | KEY ID OF VEHICLE-SIDE KEY |
|---|---|
| KEY-A | aaaa |
| KEY-B | bbbb |
| KEY-C | cccc |
| ⋮ | ⋮ |

FIG. 5

| ID OF VEHICLE | CENTER-SIDE KEY |
|---|---|
| A | KEY-A |
| B | KEY-B |
| C | KEY-X |
| D | KEY-Y |
| ⋮ | ⋮ |

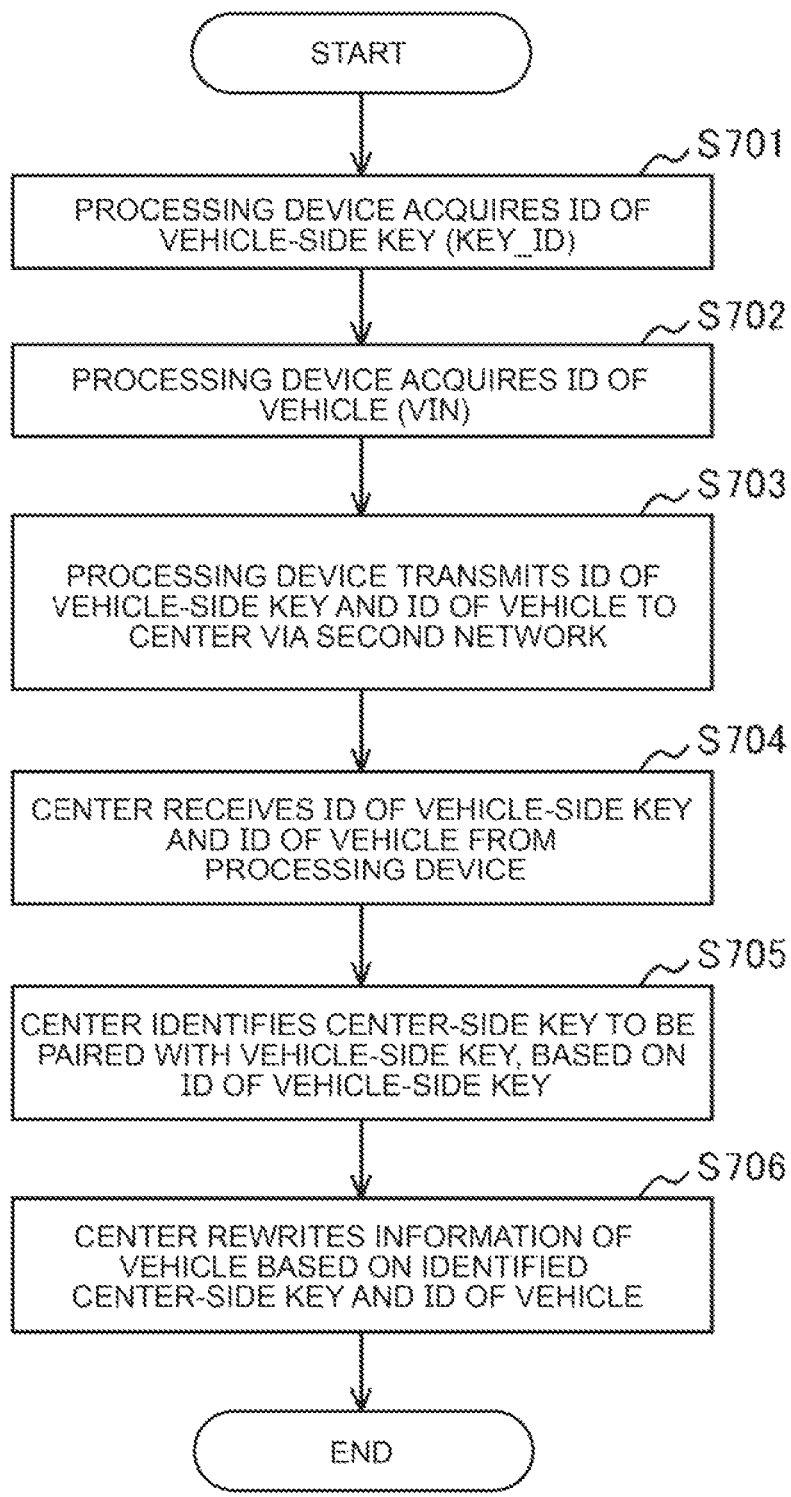

CENTER, INFORMATION REWRITING METHOD, AND NON-TRANSITORY STORAGE MEDIUM

CROSS-REFERENCE TO RELATED APPLICATION

This application claims priority to Japanese Patent Application No. 2021-015061 filed on Feb. 2, 2021, incorporated herein by reference in its entirety.

BACKGROUND

1. Technical Field

The present disclosure relates to a center, an information rewriting method, and a non-transitory storage medium for controlling software updating of an electronic control unit installed in a vehicle.

2. Description of Related Art

Vehicles have a plurality of electronic control units installed onboard, for controlling operations of the vehicle. An electronic control unit includes a processor, a temporary storage unit such as random-access memory (RAM), and non-volatile memory that is a non-volatile storage unit, such as flash read only memory (ROM). The processor realizes control functions of the electronic control unit by executing software stored in the non-volatile memory. The software stored in each electronic control unit is rewritable. Updating to a newer version of the software enables the functions of the electronic control units to be improved, new vehicle control functions to be added, and so forth.

Over-the-air (OTA) technology is known as a technology for updating software of electronic control units. In OTA technology, in-vehicle communication equipment connected to an in-vehicle network, and a communication network such as the Internet or the like, are wirelessly connected. A device that handles updating processing of the software of the vehicle downloads the software from a center having a server function, via wireless communication. Installing the downloaded software to the electronic control unit enables updating and addition of software of the electronic control unit to be performed. For example, see Japanese Unexamined Patent Application Publication No. 2004-326689 (JP 2004-326689 A).

When carrying out software update processing using this OTA technology, a key held by the vehicle (vehicle-side key) and a key managed by the center as a pair for each vehicle (center-side key) are used, and authentication processing using the key is carried out between the vehicle and the center.

SUMMARY

Of equipment installed in the vehicle, when in-vehicle equipment holding the key (vehicle-side key) used for authentication processing, such as a data communication module (DCM), for example, is replaced due to malfunctioning or the like, the key imparted to the communication module in advance will also be changed together. However, the center has no way of knowing about the replacement of the communication module. Accordingly, the center does not recognize the new key imparted in advance to the communication module after replacement as the legitimate key associated with the vehicle, and therefore cannot authenticate the vehicle. Thus, there is a problem that software update by OTA cannot be performed.

The present disclosure provides a center, an information rewriting method, and a non-transitory storage medium, capable of authenticating a vehicle even when in-vehicle equipment holding a key used for authentication processing is replaced.

According to a first aspect of the technology according to the present disclosure, a center, configured to communicate with an OTA master that controls software updating of an electronic control unit via a first network, includes a processor. The electronic control unit is installed in a vehicle. The processor is configured to store vehicle management information including key information used for authentication of the vehicle. The processor is configured to receive an authentication signal from the vehicle via the first network. The authentication signal is signed using a unique key imparted to predetermined equipment installed in the vehicle. The processor is configured to perform authentication of the vehicle based on the vehicle management information and the authentication signal. The processor is configured to, when the processor receives the key information from the vehicle, rewrite the vehicle management information stored by the processor based on the key information.

In the center according to the first aspect of the technology according to the present disclosure the processor may be configured to, when the processor receives the key information from the vehicle via a second network, rewrite the vehicle management information stored by the processor based on the key information. The second network may be different from the first network.

In the center according to the first aspect of the technology according to the present disclosure, the predetermined equipment may be a communication module configured to mediate communication between the center and the OTA master.

In the center according to the first aspect of the technology according to the present disclosure, the key information may include identification information for identifying the key imparted to the predetermined equipment and identification information for identifying the vehicle in which the predetermined equipment is installed.

In a second aspect of the technology according to the present disclosure, the information rewriting method is executed by a computer of a center including a processor and memory. The center is configured to communicate with an OTA master configured to control software updating of an electronic control unit via a first network. The electronic control unit is installed in a vehicle. The information rewriting method includes storing vehicle management information including key information used for authentication of the vehicle, and receiving an authentication signal from the vehicle via the first network. The authentication signal is signed using a unique key imparted to predetermined equipment installed in the vehicle. The information rewriting method includes performing authentication of the vehicle based on the vehicle management information and the authentication signal, and rewriting the vehicle management information based on the key information, when the key information is received from the vehicle.

In a third aspect of the technology according to the present disclosure, a non-transitory storage medium stores instructions that are executable by a computer of a center including a processor and memory, and that cause the computer to perform functions. The center is configured to communicate with an OTA master that controls software updating of an electronic control unit via a first network. The electronic control unit is installed in a vehicle. The functions include storing vehicle management information including key information used for authentication of the vehicle, and receiving an authentication signal from the vehicle via the first network. The authentication signal is signed using a unique key imparted to predetermined equipment installed in the vehicle. The functions include performing authentication of the vehicle based on the vehicle management information and the authentication signal, and rewriting the vehicle management information based on the key information, when the key information is received from the vehicle.

According to the center and so forth of the present disclosure, the vehicle can be authenticated even when the in-vehicle equipment holding the key used for authentication processing is replaced.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 4 is a diagram showing an example of a key information database;

FIG. 5 is a diagram showing an example of individual vehicle key information;

FIG. 7 is a flowchart of information rewriting processing executed in a processing device and the center.

DETAILED DESCRIPTION OF EMBODIMENTS

When in-vehicle equipment holding a key for authentication processing is replaced in a vehicle, a center according to the present disclosure acquires a key ID imparted to the replaced in-vehicle equipment and an ID of the vehicle of which the in-vehicle equipment are replaced, as key-related information, via a network different from a network that executes vehicle authentication. The center then updates the key-related information for vehicle authentication to the latest contents, based on the key-related information.

An embodiment of the present disclosure will be described below in detail with reference to the drawings.

Embodiment

Configuration

Figure 1:
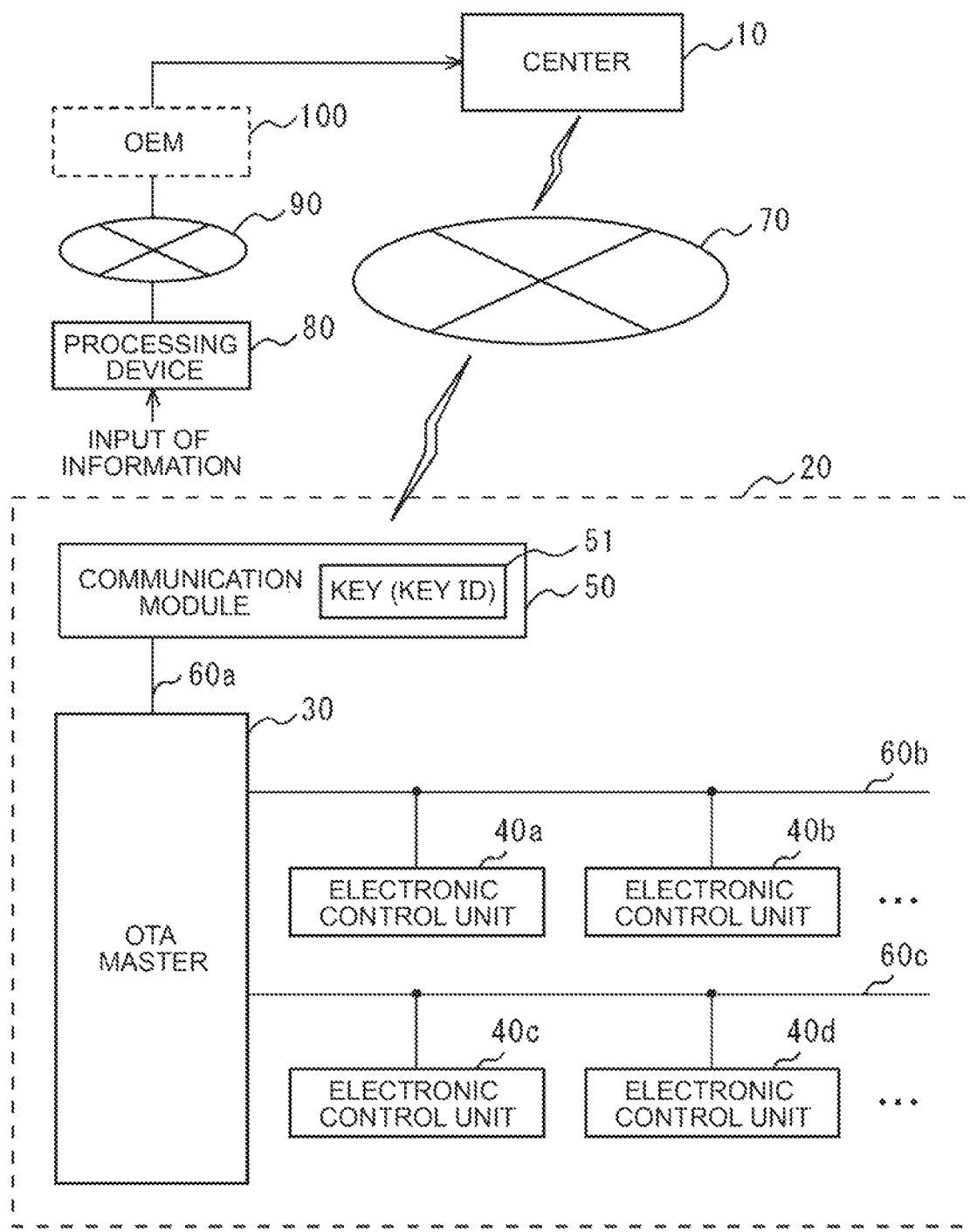
FIG. 1 is a block diagram illustrating an overall configuration of a network system including a center according to an embodiment.

FIG. 1 is a block diagram illustrating an overall configuration of a network system including the center according to the embodiment of the present disclosure. The network system illustrated in FIG. 1 is a system for updating software of a plurality of electronic control units 40a through 40d installed in a vehicle. The network system is provided with a center 10 that is outside of the vehicle, an in-vehicle network 20 constructed inside of the vehicle, and a processing device 80.

1. Center

The center 10 is capable of communicating with a later-described OTA master 30 provided to the in-vehicle network 20, via a first network 70. The center 10 is capable of managing software updating of the electronic control units 40a through 40d that are connected to the OTA master 30, by performing communication such as vehicle authentication and transmission of update data of the electronic control units. Further, the center 10 is capable of communication with the processing device 80 via a second network 90 that is different from the first network 70. The center 10 manages the vehicle key by performing communication of later-described key-related information of the vehicle via the second network 90. The center 10 has functions as a server.

Figure 2:
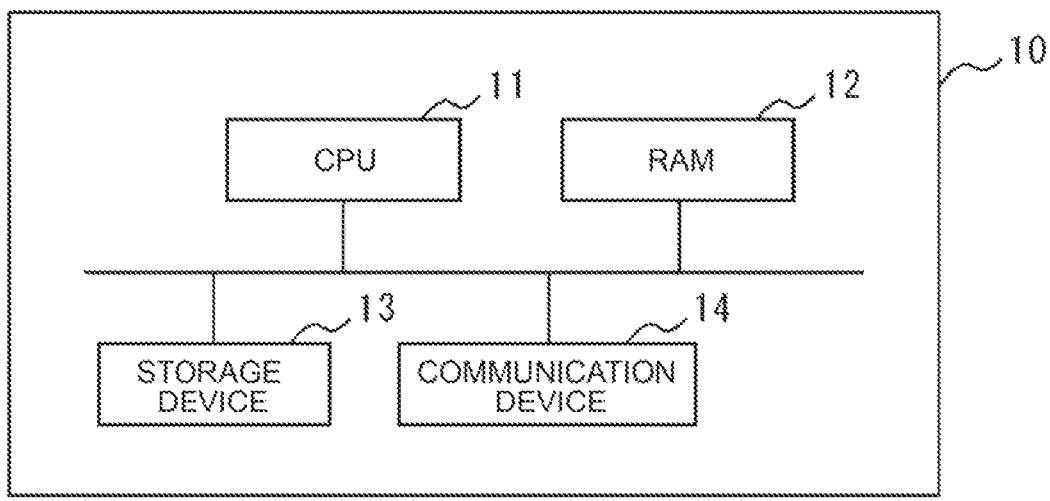
FIG. 2 is a block diagram illustrating a schematic configuration of the center.

FIG. 2 is a block diagram illustrating a schematic configuration of the center 10 in FIG. 1. As shown in FIG. 2, the center 10 includes a central processing unit (CPU) 11, random-access memory (RAM) 12, a storage device 13, and a communication device 14. The storage device 13 is a device including a readable/writable storage medium such as a hard disk drive (HDD) or a solid state drive (SSD). The storage device 13 stores programs for executing software update management, information used for software update management, update data of each electronic control unit, vehicle management information including key information used for vehicle authentication, and so forth. At the center 10, the CPU 11 executes the program read from the storage device 13, using the RAM 12 as a work region. Thus, the center 10 executes predetermined processing relating to software updating. The communication device 14 is a device for communicating with the OTA master 30 via the first network 70, and communicating with the processing device 80 via the second network 90.

Figure 3:
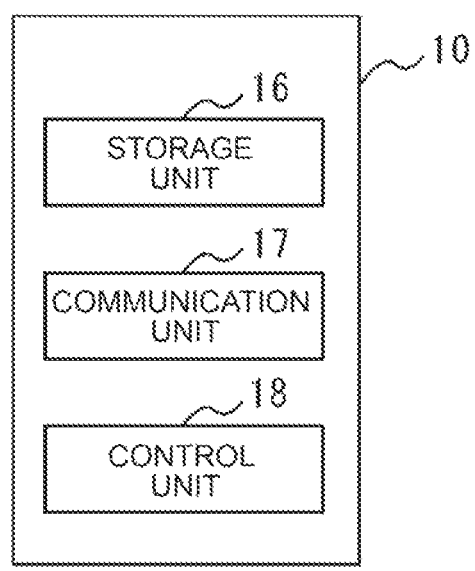
FIG. 3 is a functional block diagram of the center.

FIG. 3 is a functional block diagram of the center 10 illustrated in FIG. 2. The center 10 illustrated in FIG. 3 includes a storage unit 16, a communication unit 17, and a control unit 18. The storage unit 16 is realized by the storage device 13 shown in FIG. 2. The communication unit 17 and the control unit 18 are realized by the CPU 11 illustrated in FIG. 2 executing a program stored in the storage device 13 using the RAM 12.

The storage unit 16 stores information related to software update processing of one or more electronic control units installed in the vehicle. The storage unit 16 stores update management information and software update data of the electronic control unit as information related to the software update processing. The update management information is information in which information indicating software usable by the electronic control units is associated with each vehicle identification information (vehicle ID) that identifies the vehicle. A combination of the latest version information of software of each of the electronic control units is defined as, for example, information indicating software usable by the electronic control units.

Also, the storage unit 16 stores, in advance, information related to the center-side key that is paired with the vehicle-side key issued by a predetermined entity, as a key information database. The predetermined entity manages the key used to authenticate the vehicle. FIG. 4 shows an example of the key information database stored in the storage unit 16. A main unit of the vehicle-side key issued by the predetermined entity is secretly imparted to equipment used for vehicle authentication processing, such as the communication module 50, for example, in advance at the time of manufacturing the equipment. On the other hand, the center 10 is provided with a key ID, which is identification information for identifying the main unit of the vehicle-side key, and information regarding a main unit of the center-side key paired with the vehicle-side key. The example in FIG. 4 shows that the center-side key (main unit) KEY-A is paired with the vehicle-side key identified by key ID aaaa.

Further, the storage unit 16 stores individual vehicle key information. The individual vehicle key information is information in which the vehicle identification information (vehicle ID) for identifying the vehicle and the center-side key are associated. The center-side key is used to verify authentication signals signed with the vehicle-side key. FIG. 5 shows an example of individual vehicle key information stored in the storage unit 16. The example in FIG. 5 shows that the center-side key KEY-A is used to verify authentication signals from the vehicle with the vehicle ID A. This individual vehicle key information may be managed by being included in other information, such as the aforementioned update management information. The individual vehicle key information is appropriately rewritten by communication via the later-described second network 90.

The communication unit 17 is capable of receiving software update confirmation requests from the OTA master 30. An example of an update confirmation request is information transmitted from the OTA master 30 to the center 10 when the power or the ignition (IGN) of the vehicle is turned on. Update confirmation requests are information for requesting the center 10 to confirm whether there is update data for the electronic control units. In addition, the communication unit 17 is capable of receiving transmission requests (download requests) for distribution packages from the OTA master 30. Upon receiving a download request for a distribution package, the communication unit 17 transmits the distribution package to the OTA master 30. The distribution package includes software update data generated by the later-described control unit 18, for the electronic control unit.

When the communication unit 17 receives the update confirmation request from the OTA master 30, the control unit 18 determines whether there is software update data for the electronic control units installed in the vehicle identified by the vehicle ID included in the update confirmation request, based on the update management information stored in the storage unit 16. Upon determining that there is software update data for the electronic control unit, and receiving a download request for the distribution package from the OTA master 30, the control unit 18 generates a distribution package containing the corresponding update data stored in the storage unit 16.

2. In-Vehicle Network

The in-vehicle network 20 includes the OTA master 30, the electronic control units 40a through 40d, and the communication module 50. The OTA master 30 and the communication module 50 are connected via a bus 60a. The OTA master 30 and the electronic control units 40a and 40b are connected via a bus 60b. The OTA master 30 and the electronic control units 40c and 40d are connected via a bus 60c.

The OTA master 30 is capable of wirelessly communicating with the center 10 via the first network 70 through the communication module 50. The OTA master 30 is a device having a function of managing the OTA state, controlling the software update sequence, and performing software updating of the electronic control unit of which software is an object of updating (hereinafter referred to as "target electronic control unit"). The OTA master 30 controls the software update of the target electronic control unit of the electronic control units 40a through 40d, based on the update data acquired from the center 10. The OTA master 30 may also be referred to as a "central gateway (CGW)".

Figure 6:
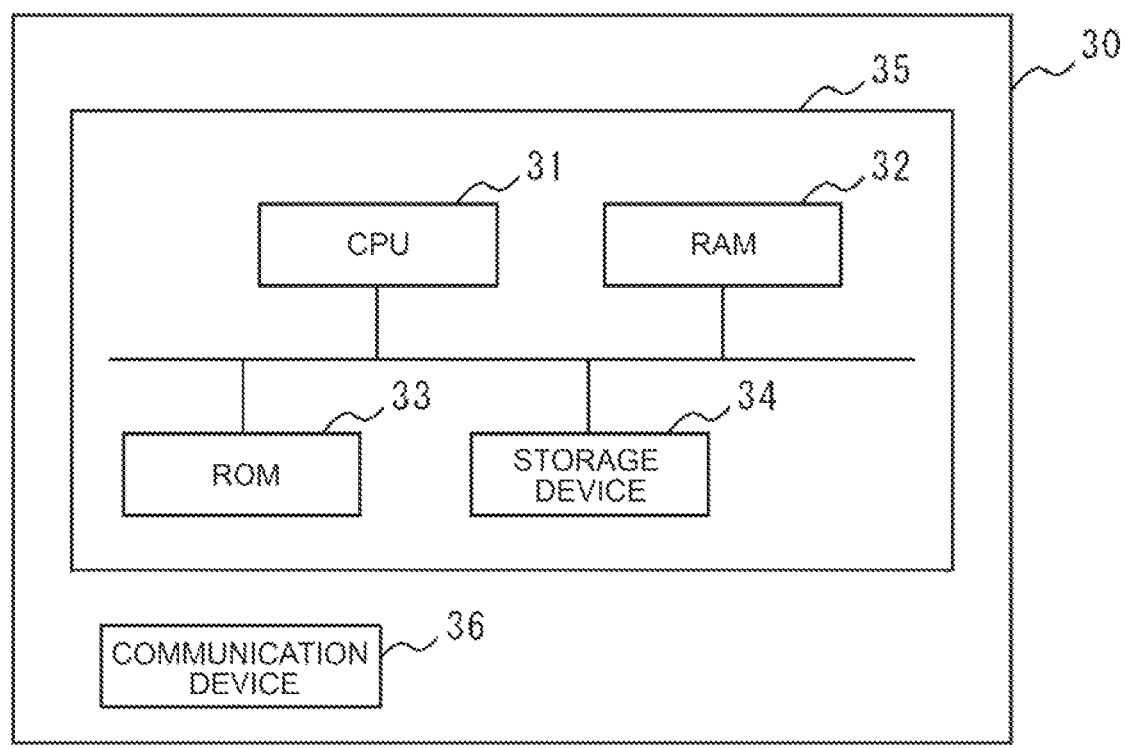
FIG. 6 is a block diagram illustrating a schematic configuration of an OTA master.

FIG. 6 is a block diagram illustrating a schematic configuration of the OTA master 30 in FIG. 1. As illustrated in FIG. 6, the OTA master 30 includes a CPU 31, RAM 32, ROM 33, a storage device 34, and a communication device 36. The CPU 31, the RAM 32, the ROM 33, and the storage device 34 make up a microcomputer 35. In the OTA master 30, the CPU 31 executes programs read from the ROM 33, using the RAM 32 as a work region. Accordingly, the CPU 31 executes predetermined processing related to software updating. The communication device 36 is a device for communicating with the communication module 50 and the electronic control units 40a through 40d, via the buses 60a through 60c illustrated in FIG. 1.

The electronic control units 40a through 40d are devices (ECUs) for controlling operations of various parts of the vehicle. Although four electronic control units 40a through 40d are illustrated in FIG. 1, the number of electronic control units is not limited in particular. A display device (human-machine interface (HMI)) for performing various types of display may be connected to the OTA master 30. Examples of the various types of display includes a display indicating that there is update data during the software update processing of the electronic control units 40a through 40d, displaying an agreement request screen prompting a user or administrator of the vehicle to agree to software updating, displaying results of software updating, and so forth. An automotive navigation system or the like can be used for the display device. In addition, the number of buses connecting the electronic control unit to the OTA master 30 is not limited in particular. For example, the aforementioned display device may be connected to the OTA master 30 via a bus other than the buses 60a through 60c.

The communication module 50 is a unit having a function of controlling communication between the center 10 and the vehicle. The communication module 50 is communication equipment for connecting the in-vehicle network 20 to the center 10. The communication module 50 is wirelessly connected to the center 10 via the first network 70. Vehicle authentication, update data downloading, and so forth, are performed by the OTA master 30 using a wireless connection. In addition, the communication module 50 may be configured to be wirelessly connected to the processing device 80, in order to provide information regarding the key held by the vehicle. The key information includes identification information (key ID) that identifies a key 51 uniquely imparted to the communication module 50, and identification information (vehicle ID) that identifies the vehicle in which the communication module 50 is installed. Note that a configuration may be made in which the communication module 50 is included in the OTA master 30.

The processing device 80 is, for example, an information input terminal such as a personal computer or the like, installed at a dealer of the vehicle, or the like. The processing device 80 is connected to the center 10 via the second network 90 that is different from the first network 70. The processing device 80 performs communication of the above-described key information and so forth. Note that the connection between the processing device 80 and the center 10 via the second network 90 may be made via an original equipment manufacturer (OEM) 100, which is a finished vehicle manufacturer. With this configuration, the key information can be shared and managed by the center 10 and the OEM 100.

Overview of Software Update Processing

The OTA master 30 transmits a software update confirmation request to the center 10, with the power or ignition (IGN) of the vehicle being turned on, for example, as a trigger. The update confirmation request includes the vehicle ID for identification of the vehicle, and software versions for the electronic control units 40a through 40d connected to the in-vehicle network 20. The vehicle ID and the software versions for the electronic control units 40a through 40d are used to determine whether there is software update data for the electronic control units, by making comparison with the latest software version held by the center 10 for each vehicle ID. Further, the OTA master 30 receives a notification indicating whether there is update data from the center 10 as a response to the update confirmation request. When there is software update data for the electronic control units, the OTA master 30 transmits a download request for a distribution package to the center 10. Thereafter, the OTA master 30 receives the distribution package transmitted from the center 10. The distribution package may include, in addition to the update data, verification data for verifying the authenticity of the update data, the number of pieces of the update data, the order of installation, various types of control information to be used during software updating, and so forth.

The OTA master 30 determines whether there is software update data for the electronic control units, based on the response to the received update confirmation request from the center 10. In addition, the OTA master 30 verifies the authenticity of the distribution package received from the center 10 and stored in the storage device 13. Further, the OTA master 30 transfers one or more pieces of update data downloaded in the distribution package to the target electronic control unit, and causes the target electronic control unit to install the update data. After installation is complete, the OTA master 30 instructs the target electronic control unit to activate the installed update version of the software.

As acceptance request processing, the OTA master 30 causes the output device to output a notification that acceptance is required for the software update, and a notification prompting input of accepting the software update. A display device that makes notification by display, an audio output device that makes notification by audio, or the like, can be used as the output device. For example, when the display device is used as an output device in the acceptance request processing, the OTA master 30 causes the display device to display an acceptance request screen for requesting acceptance of the software update. The display device is capable of displaying a notification prompting a particular input operation, such as the user or the administrator pressing an acceptance button when accepting. In addition, in the acceptance request processing, the OTA master 30 is capable of displaying on the display device text, icons, or the like, notifying that there is software update data for the electronic control units, displaying on the display device restrictions while the software update processing is being executed, and so forth. Upon receiving the input indicating the accepting from the user or the administrator that the OTA master 30 has accepted, the OTA master 30 executes the above installation and activation control processing, and updates the software of the target electronic control unit.

The software update processing is made up of a download phase, an installation phase, and an activation phase. The download phase is a phase in which the OTA master 30 downloads update data from the center 10. The installation phase is a phase in which the OTA master 30 transfers the downloaded update data to the target electronic control unit and installs the update data in the storage region of the target electronic control unit. The activation phase is a phase in which the update version of the software installed by the target electronic control unit is activated.

Downloading is processing in which the OTA master 30 receives the update data for updating the software for the electronic control unit transmitted from the center 10 by in the form of a distribution package, and stores the update data in the storage device 13. The download phase includes not only execution of downloading, but also includes control of a series of processing relating to downloading, such as judging whether downloading can be executed, verification of the update data, and so forth.

The update data transmitted from the center 10 to the OTA master 30 may contain any of update software for the electronic control unit, compressed data in which update software has been compressed, and divided data in which update software or compressed data has been divided. In addition, the update data may include a number of the target electronic control unit (ECU_ID) and a number for identifying the software of the electronic control unit before updating (ECU_Software_ID). The update data is downloaded as the aforementioned distribution package that contains update data for one or more electronic control units.

Installation is processing in which the OTA master 30 writes update software (an update version program) to the target electronic control unit, based on the update data downloaded from the center 10. The installation phase includes not only execution of installing, but also includes control of a series of processing relating to installing, such as judging whether installation can be executed, transfer of the update data, verification of the update software, and so forth.

When the update data includes the update software itself, the OTA master 30 transfers the update data (update software) to the target electronic control unit in the installation phase. When the update data includes compressed data, difference data, or divided data of the update software, the OTA master 30 may transfer the update data to the target electronic control unit, and the target electronic control unit may generate the update software from the update data. Alternatively, the update software may be transferred to the target electronic control unit after the OTA master 30 generates the update software from the update data. Now, the update software can be generated by decompressing compressed data or assembling difference data or divided data.

The update software can be installed by the target electronic control unit based on an installation request from the OTA master 30. Alternatively, the target electronic control unit that has received the update data may autonomously perform installation, without receiving an explicit instruction from the OTA master 30.

Activation is processing in which the target electronic control unit enables (activates) the installed update software. The activation phase includes not only execution of activating, but also includes a series of control relating to activating, such as judging whether activation can be executed, verification of execution results, and so forth.

Activation of the update software can be performed by the target electronic control unit, based on an activation request from the OTA master 30. Alternatively, the target electronic control unit, which has received the update data, may autonomously activate the update software following completion of installation, without receiving an explicit instruction from the OTA master 30.

Note that the software update processing can be performed successively or in parallel for each of the electronic control units.

Further, the "software update processing" in the present specification includes not only processing of successively performing all of the downloading, installation, and activation, but also a process of performing only a part of the downloading, installation, and activation.

Processing

Next, the processing executed in the network system according to the present embodiment will be described further with reference to FIG. 7. FIG. 7 is a flowchart showing procedures of information rewriting processing executed by the processing device 80 installed in a vehicle dealer or the like and the center 10.

The information rewriting processing shown in FIG. 7 is performed when a change occurs in in-vehicle equipment that has a key used for vehicle authentication, out of the equipment installed in the vehicle, for example, such as when the communication module 50 is replaced, or the like.

Step S701

After replacing the communication module 50, the processing device 80 acquires the ID (key ID) of the key imparted to the communication module 50 (vehicle-side key). For this acquisition, for example, a worker or the like in the dealer who has performed the work of replacing the communication module 50 may input the ID of the key imparted to the communication module 50, newly installed to the vehicle by the replacement, to the processing device 80. Alternatively, an arrangement may be made in which the key ID is transmitted from the vehicle to the processing device 80 when the power is first turned on after the replacement. Upon the vehicle-side key ID being acquired, the processing advances to step S702.

Step S702

The processing device 80 acquires the ID of the vehicle of which the communication module 50 has been replaced. For the vehicle ID, a vehicle identification number (VIN), which is a unique code including a serial number for identifying each vehicle, can be used. This acquisition may be performed by the worker in the dealer or the like, who entered the key ID in the above step S701, by entering the vehicle ID. Alternatively, an arrangement may be made in which the vehicle ID is transmitted from the vehicle to the processing device 80 when the power is first turned on after the replacement. Upon the ID of the vehicle being acquired, the processing advances to step S703.

Step S703

The processing device 80 transmits the key information including the vehicle side key ID and the vehicle ID that have been acquired to the center 10 via the second network 90. Note that the key information may also be provided to the OEM 100, which is a finished vehicle manufacturer, in order to share, manage, and so forth, the information with the center 10. When the vehicle-side key ID and the vehicle ID are transmitted to the center 10, the processing advances to step S704.

Step S704

The center 10 receives the vehicle-side key ID and the vehicle ID from the processing device 80, via the second network 90. When the center 10 receives the vehicle-side key ID and the vehicle ID, the processing advances to step S705.

Step S705

The center 10 identifies the center-side key to be paired with the vehicle-side key, based on the vehicle-side key ID received from the processing device 80. This identifying can be performed by searching the key information database using the ID of the vehicle-side key, and extracting the center-side key associated with the ID of the vehicle-side key. When the center-side key to be paired with the vehicle-side key is identified, the processing advances to step S706.

Step S706

The center 10 rewrites the vehicle information managed by the storage unit 16, based on the identified center-side key and the vehicle ID received from the processing device 80. Specifically, the center-side key for verification that is associated with the vehicle in the individual vehicle key information shown in FIG. 5, is rewritten and updated. Thus, the information rewriting processing ends.

Operations and Effects

As described above, when in-vehicle equipment (communication module or the like) in the vehicle that holds a key used for authentication processing is replaced, the center according to the embodiment of the present disclosure acquires the ID of the key imparted to the in-vehicle equipment newly installed to the vehicle by the replacement, and the ID of the vehicle of which the in-vehicle equipment has been replaced, as key-related information, from the processing device via a second network that is different from the first network that executes vehicle authentication.

Thus, updating can be made to the latest contents of the individual vehicle key information in which the center-side key and the vehicle ID are associated, based on the key-related information acquired in advance from the processing device, before vehicle authentication via the first network is performed in the software update processing using OTA technology. The center-side key is used to verify authentication signals signed by the vehicle-side key. Therefore, a situation can be circumvented in which the center cannot authenticate the vehicle with the new key of the replaced in-vehicle equipment, and update of the software by OTA cannot be performed.

Now, an OEM back-office system that manages key information may be used as the second network. Security of the key can be ensured by using the OEM back-office system.

Although an embodiment of the technology according to the present disclosure has been described above, the present disclosure can be understood as being, in addition to a center, an update method executed by a center provided with a processor and memory, a program, a computer-readable non-transitory storage medium storing the program, and so forth.

The technology according to the present disclosure can be used in a network system for updating software of an electronic control unit.

What is claimed is:

1. A center configured to communicate with an OTA master configured to control software updating of an electronic control unit via a first network, the electronic control unit being installed in a vehicle, the center comprising a processor configured to:

control the storage of vehicle management information including key information used for authentication of the vehicle, the key information including (i) identification information for identifying a unique key imparted to a predetermined equipment installed in the vehicle and (ii) identification information for identifying the vehicle in which the predetermined equipment is installed;

receive an authentication signal from the vehicle via the first network, the authentication signal being signed using the unique key;

receive the key information from the vehicle via a second network that is different from the first network;

when the processor receives the authentication signal, perform authentication of the vehicle based on the vehicle management information and the authentication signal; and rewrite the vehicle management information stored by the processor based on the key information, when the processor receives the key information from the vehicle via the second network.

2. The center according to claim 1, wherein the predetermined equipment is a communication module configured to mediate communication between the center and the OTA master.

3. The center according to claim 1, wherein the processor is configured to rewrite the vehicle management information stored by the processor based on the key information, when the processor receives the key information from the vehicle, via the second network and an information terminal that is managed by a dealer of the vehicle or an original equipment manufacturer, which is a finished vehicle manufacturer.

4. The center according to claim 1, wherein the unique key is secretly imparted to the predetermined equipment in advance at the time of manufacturing the predetermined equipment.

5. The center according to claim 1, wherein:
   (i) the key information is different from the unique key; and
   (ii) the identification information for identifying the unique key is different from the unique key.

6. An information rewriting method executed by a computer of a center including a processor and memory, the center being configured to communicate with an OTA master configured to control software updating of an electronic control unit via a first network, the electronic control unit being installed in a vehicle, the information rewriting method comprising:
   storing vehicle management information including key information used for authentication of the vehicle, the key information including (i) identification information for identifying a unique key imparted to a predetermined equipment installed in the vehicle and (ii) identification information for identifying the vehicle in which the predetermined equipment is installed;
   receiving an authentication signal from the vehicle via the first network, the authentication signal being signed using the unique key;
   receiving the key information from the vehicle via a second network that is different from the first network;
   when the processor receives the authentication signal, performing authentication of the vehicle based on the vehicle management information and the authentication signal; and
   rewriting the vehicle management information based on the key information, when the key information is received from the vehicle via the second network.

7. A non-transitory storage medium storing instructions that are executable by a computer of a center including a processor and memory, and that cause the computer to perform functions, the center being configured to communicate with an OTA master configured to control software updating of an electronic control unit via a first network, the electronic control unit being installed in a vehicle, the functions comprising:
   storing vehicle management information including key information used for authentication of the vehicle, the key information including (i) identification information for identifying a unique key imparted to a predetermined equipment installed in the vehicle and (ii) identification information for identifying the vehicle in which the predetermined equipment is installed;
   receiving an authentication signal from the vehicle via the first network, the authentication signal being signed using the unique key;
   receiving the key information from the vehicle via a second network that is different from the first network;
   when the processor receives the authentication signal, performing authentication of the vehicle based on the vehicle management information and the authentication signal; and
   rewriting the vehicle management information based on the key information, when the key information is received from the vehicle via the second network.

* * * * *